(12) United States Patent
Satoh et al.

(10) Patent No.: US 7,408,733 B2
(45) Date of Patent: Aug. 5, 2008

(54) MAGNETIC DISK DRIVE AND MAGNETIC DISK MEDIUM

(75) Inventors: Naoki Satoh, Kanagawa (JP); Yoshiteru Ishida, Kanagawa (JP); Yoshiju Watanabe, Kanagawa (JP); Terumi Takashi, Kanagawa (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 202 days.

(21) Appl. No.: 11/400,579

(22) Filed: Apr. 7, 2006

(65) Prior Publication Data

US 2006/0227451 A1 Oct. 12, 2006

(30) Foreign Application Priority Data

Apr. 7, 2005 (JP) ............................. 2005-110735

(51) Int. Cl.
G11B 5/596 (2006.01)
G11B 19/26 (2006.01)
(52) U.S. Cl. .................................. 360/73.03; 360/77.08
(58) Field of Classification Search ........................ None
See application file for complete search history.

(56) References Cited

U.S. PATENT DOCUMENTS 6,215,609 B1 4/2001 Yamashita et al. ....... 360/73.03
6,504,663 B2 1/2003 Hirano et al.
7,088,542 B2 * 8/2006 Kang ....................... 360/73.03

FOREIGN PATENT DOCUMENTS

JP 10-198970 7/1988
JP 10-302207 11/1998

* cited by examiner

*Primary Examiner*—Hoa T. Nguyen
*Assistant Examiner*—James L Habermehl
(74) *Attorney, Agent, or Firm*—Townsend and Townsend and Crew LLP; Patrick Duncan (57) ABSTRACT

Embodiments of the invention increase the convenience of a magnetic disk drive for portable use by shortening a period of time required to record a large amount of data, and by increasing the reproduction time, in the magnetic disk drive. In one embodiment, an area between servo data parts is interpolated by servo data parts, each of which stores a burst signal, so that the allocation density of a burst signal is made k times. At the time of write operation in which data is written, only the servo data parts are made use of to perform the servo control while a disk is driven at high rotational speed so as to reduce the recording time. At the time of read operation in which data is reproduced, the servo data parts are made use of to ensure the required precision of the servo control at low rotational speed that is 1/k of the rotational speed at the time of write operation. The reproduction at low rotational speed enables the reduction in power consumption.

11 Claims, 5 Drawing Sheets

MAGNETIC DISK DRIVE AND MAGNETIC DISK MEDIUM

CROSS-REFERENCES TO RELATED APPLICATIONS

This application claims priority from Japanese Patent Application No. JP2005-110735, filed Apr. 7, 2005, the entire disclosure of which is incorporated herein by reference.

BACKGROUND OF THE INVENTION

The present invention relates to magnetic disk drives and magnetic disk media, and more particularly to magnetic disk drives, and the like, that are suitable for portable devices.

In recent years, with the development of small-size hard disk drives (HDDs), a personal digital assistant, or a cellular phone, has a built-in HDD in which video data and audio data (AV data) are accumulated. The video data and the audio data are reproduced and utilized on the road. The above is the tendency of products that are being developed. As for this portable device, the AV data is stored in the HDD that is a mass storage device; and at the time of reproduction, data is transferred, whenever necessary, from a magnetic disk medium to a buffer memory that is formed of a semiconductor memory. Thus, continuous reproduction is achieved by this buffer memory.

As far as portable devices for such uses are concerned, it is desirable that a period of time required to write AV data to a built-in HDD be as short as possible, and that the continuous reproduction time is as long as possible.

In recent years, HDDs can achieve a high medium transfer rate as a result of the speedup of the rotational speed. Here, an example taken as one of the conventional devices is a built-in HDD, a medium transfer rate of which is 4 MB/sec., and the start time from a stopped state to a steady state at high-speed rotation of which is 5 seconds. Accumulation/reproduction operation of music data and of image data using this example will be discussed as below.

First of all, for example, music data having a length of about 20 minutes, which is equivalent to three or four pieces of music, becomes MP3 data having a size of about 20 MB. The read time itself taken to read this amount of data is five seconds. The specified starting time described above is added to this. As a result, the driving time of the HDD is 10 seconds. To be more specific, the HDD consumes the electric power for acceleration for five seconds before the HDD enters a state of high-speed rotation, and then consumes the electric power to maintain the state of high-speed rotation for five seconds.

In addition, if MPEG-2 encoding is performed for content such as, for example, a movie having a length of two hours in consideration of the reproduction using a monitor having the normal size, the size of image data becomes about 4 GB. Moreover, an average reproduction rate of about 4 M bits per second is required. For example, on the assumption that the amount of data to be successively transferred from the HDD to the buffer is 20 MB, the driving time of the HDD is 10 seconds, which is the same as the above example of the music data. At the average reproduction rate described above, the length of time required to complete the reproduction of the data having a size of 20 MB is 40 seconds. To be more specific, during every 40 seconds, the electric power is consumed to start operation for five seconds and also to maintain the rotation for five seconds.

BRIEF SUMMARY OF THE INVENTION

If it is possible to minimize the power consumption required to accelerate until the HDD enters the high-speed rotation state and the power consumption required to maintain the high-speed rotation state, it becomes possible to lengthen the continuous reproduction time of the portable devices driven by battery. The reduction in power consumption, therefore, was one of the conventional challenges. Here, the power consumption at the time of starting can be reduced by increasing the capacity of a buffer memory, and by decreasing the frequency of starting. However, under the existing circumstances, large-capacity memories having a size of tens of megabytes cost much, and accordingly it is difficult to build such memories into portable devices, which is a main problem.

Another problem is that if the capacity of the buffer memory is small, the number of times the HDD is turned ON/OFF increases, which may cause a decrease in reliability and an increase in noises.

In addition, for example, if the large-capacity image content having a size of about 4 GB, which was described as the example, is accumulated in a small-size built-in HDD, 1000 seconds (about 17 minutes) of time is required on the assumption that a transfer rate of the HDD is 4 MB/sec. In other words, for example, if the content which is viewed at home is brought out, the length of time required to store the content is too long, which is also a problem. In this connection, it is desirable that the length of time taken to newly write image data to, for example, a built-in HDD of a cellular phone be several minutes or less.

The present invention is devised to solve the above-mentioned problems. A feature of the present invention is to provide a magnetic disk drive in which the power consumption is reduced with the length of time taken to write data to the HDD being shortened, and also to provide a magnetic disk medium used for the magnetic disk drive.

According to one aspect of the present invention, there is provided a magnetic disk drive. The magnetic disk drive comprises a magnetic disk medium on which first servo data or second servo data, which partitions a track, is selectively written; and a control circuit that performs, at high rotational speed, write operation of writing user data to an user data part in the track, and that performs, at low rotational speed, read operation of reading the user data from the user data part in the track. The first servo data forms first servo sectors that are discretely located on the track, and is read out at least at the time of the write operation between the write operation and the read operation. The second servo data forms second servo sectors that are located between the first servo sectors, and is read out only at the time of the read operation between the write operation and the read operation.

According to another aspect of the present invention, there is provided a magnetic disk medium using a so-called sector servo method, in which servo data and user data are written to a track. The servo data includes first servo data, a gap area having the specified length in which no data is written being located at a position adjacent to the first servo data; and second servo data, data being allowed to be written up to a position adjacent to the second servo data. The first servo data or the second servo data is selectively written to the track. The gap area having the specified length is formed as a gap part, the length of which is greater than or equal to the physical distance in the track direction between a write element for writing data, and a read element for reading data, of a read/write head.

According to the present invention, write operation is performed at relatively high rotational speed, whereas read operation is performed at relatively low rotational speed. Performing the write operation at high rotational speed makes it possible to reduce the length of time taken to write data to an HDD. On the other hand, if the read operation is performed at low rotational speed, the acceleration at the time of starting up becomes gentle, and a pulse-drive frequency for example at steady rotation is reduced, which enable the reduction in power consumption. Additionally, because data is reproduced from the buffer memory in parallel with the read operation, data can be newly buffered, by read operation, in a buffer area from which the data has already been reproduced. Accordingly, once the HDD is started up, the amount of data which can be successively read out from the HDD increases. In other words, the number of times the HDD is started up is reduced, which enables the reduction in power consumption. If the read operation at low rotational speed is performed by use of only servo data (the first servo data), which is located on a track and is used at the time of write operation, a period of feedback control using the servo data becomes long. This is not desirable from the viewpoint of the position control of a head. For this reason, servo data (the second servo data) used only at the time of read operation is formed between the first servo data and the adjacent first servo data thereof, making it possible to perform stable read operation. Moreover, the second servo data differs from the first servo data. More specifically, it is not necessary to form a gap area adjacent to the second servo data. Accordingly, it is possible to minimize the decrease in user-available storage capacity of a magnetic disk medium, the decrease resulting from writing of the second servo data. Consequently, it becomes possible to store long-time content in the HDD, and thereby to carry the long-time content stored in the HDD on the road.

DETAILED DESCRIPTION OF THE INVENTION

Embodiments according to the present invention (hereinafter referred to as "embodiments") will be described with reference to the drawings as below.

Figure 1:
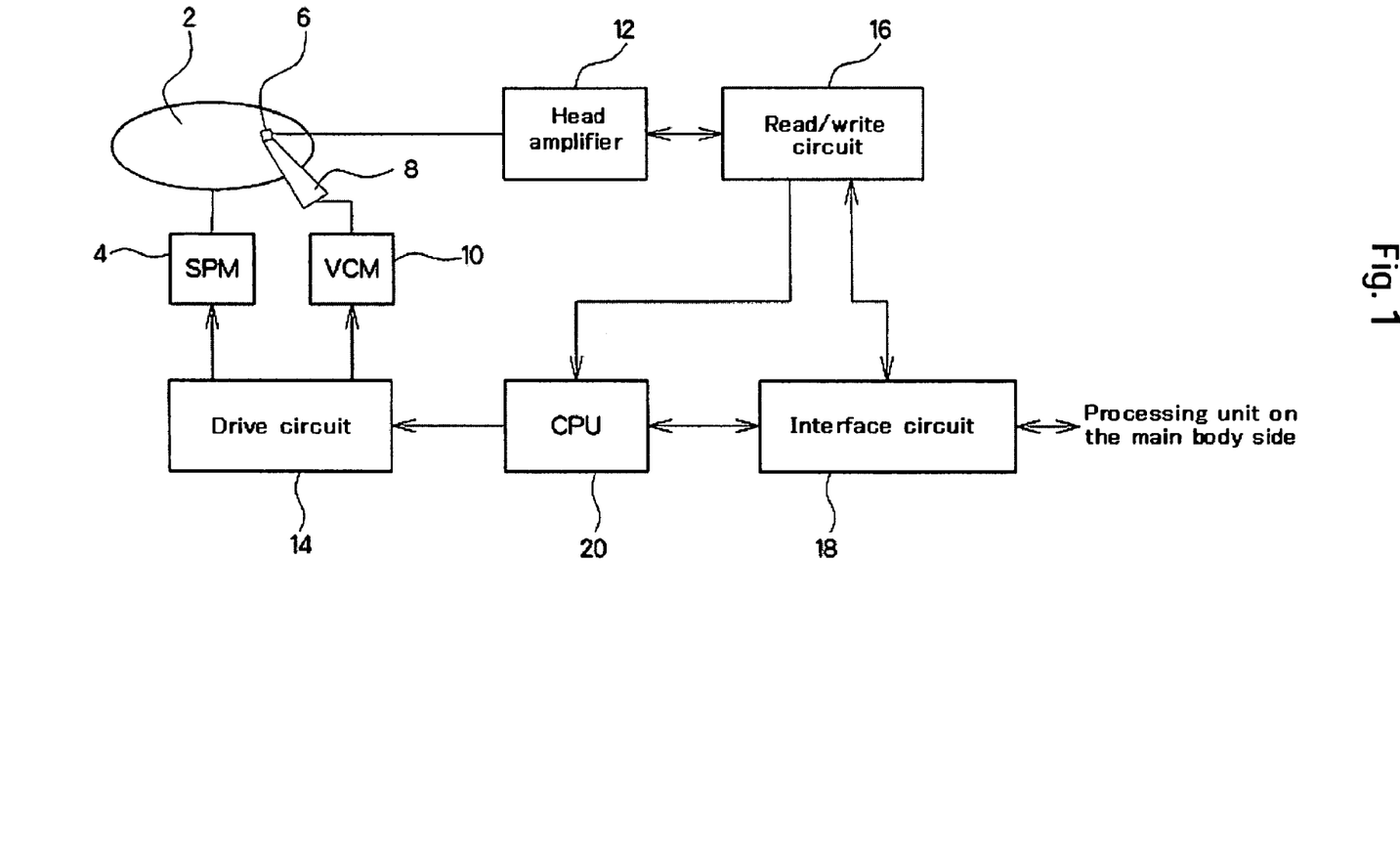
FIG. 1 is a block diagram schematically illustrating a configuration of a magnetic disk drive according to an embodiment of the invention.

FIG. 1 is a block diagram schematically illustrating a configuration of a magnetic disk drive according to this embodiment. The magnetic disk drive comprises a magnetic disk medium (disk) 2, a spindle motor (SPM) 4, a head element (head) 6, a head arm 8, a voice coil motor (VCM) 10, a head amplifier 12, a drive circuit 14, a read/write circuit 16, an interface circuit 18, and CPU 20. The magnetic disk drive is built into, for example, personal digital assistants and cellular phones. In addition, the magnetic disk drive is used to store and reproduce music data, video data, and the like.

Information is magnetically written on the disk 2 along a plurality of tracks that are concentrically formed on surfaces of the disk 2. Each track is partitioned into a plurality of servo sectors by means of servo data written beforehand.

The disk 2 is rotated by the SPM 4. The head 6 is mounted to a tip of the head arm 8. The VCM 10 changes a direction of the head arm 8, causing the head 6 to move across tracks. As a result, seek operation is achieved. When writing/reading information, the head 6 is located at a position in proximity to a surface of the rotating disk 2. At the time of write operation, a magnetization pattern, which changes along a track, is formed on the surface of the disk 2. On the other hand, at the time of read operation, a change in magnetic field caused by the magnetization pattern formed on the surface of the disk 2 is detected. The drive circuit 14 drives the SPM 4 and the VCM 10 under the control of the CPU 20.

The head 6 is connected to the read/write circuit 16 through the head amplifier 12. The head amplifier 12 amplifies an electric signal to/from the head 6. The read/write circuit 16 amplifies an electric signal coming from the head 6 by the head amplifier 12, and then detects servo data written on the disk 2 to acquire position information of the head 6 according to the servo data in question. The read/write circuit 16 determines a truck number and a servo sector number, as position information about the head 6, and then outputs both of them to the CPU 20. In addition, through the interface circuit 18, the read/write circuit 16 transmits/receives user data to/from a processing unit on the main body side of the personal digital assistant into which the magnetic disk drive in question is built.

At the time of writing data, an address at which data is written (write address) and user data are inputted from the processing unit on the main body side through the interface circuit 18. The interface circuit 18 outputs the write address to the CPU 20, and buffers the user data. The CPU 20 gives a control instruction to the drive circuit 14 according to the write address. When starting the write operation, the drive circuit 14 starts driving the SPM 4 so as to start the rotation operation of the disk 2 that is kept stopped before the SPM 4 is driven. As described below, the rotational speed of the disk 2 at the time of write operation is higher than that at the time of read operation. Here, for example, the CPU 20 gives an instruction of the rotational speed to the drive circuit 14 according to a kind of operation, that is to say, the write operation or the read operation. This enables the control of the rotational speed. As soon as the rotation of the disk 2 reaches a steady state, the drive circuit 14 drives the VCM 10 to move the head 6 to a track corresponding to the write address. In addition, on the basis of position information about the head 6 that is inputted from the read/write circuit 16, the CPU 20 calculates the timing in which a data sector corresponding to the write address arrives at a position of the head 6. Then, according to the timing, the user data to be written at the write address in question is read out from a buffer memory of the interface circuit 18 to the read/write circuit 16. The user data is modulated in the read/write circuit 16 as specified, and then the modulated user data is written to the disk 2 through the head amplifier 12 and the head 6.

On the other hand, at the time of reading data, an address at which the data is read out (read address) is inputted into the interface circuit 18 from the processing unit on the main body side. The interface circuit 18 outputs the read address to the CPU 20. The CPU 20 gives a control instruction to the drive circuit 14 according to the read address. When starting the read operation, the drive circuit 14 starts driving the SPM 4 so as to start the rotation operation of the disk 2 that is kept stopped before the SPM 4 is driven. The rotational speed of the disk 2 is so controlled that the rotational speed at the time of read operation is lower than that at the time of write operation. As is the case with the write operation, the rotational speed is controlled by, for example, the CPU 20. The drive circuit 14 drives, for example, the VCM 10 to move the head 6 to a track corresponding to the read address. The read/write circuit 16 outputs, to the CPU 20, position information about the head 6 that has been acquired from each servo data passing under the head 6. On the basis of the position information about the head 6 that is inputted from the read/write circuit 16, the CPU 20 detects the timing in which a servo sector corresponding to the read address is read out, and then reads out, according to the timing, user data stored in a data sector corresponding to the read address. In this case, the read/write circuit 16 demodulates the user data from a signal read out from the disk 2 through the head 6 and the head amplifier 12. The read/write circuit 16 outputs the user data to the interface circuit 18. The interface circuit 18 buffers the user data. The interface circuit 18 outputs the user data corresponding to the read address from the buffer memory to the processing unit on the main body side. If the read operation is completed, or if the buffer memory becomes full, the CPU 20 instructs the drive circuit 14 to stop the rotation of the disk 2.

Figure 2:
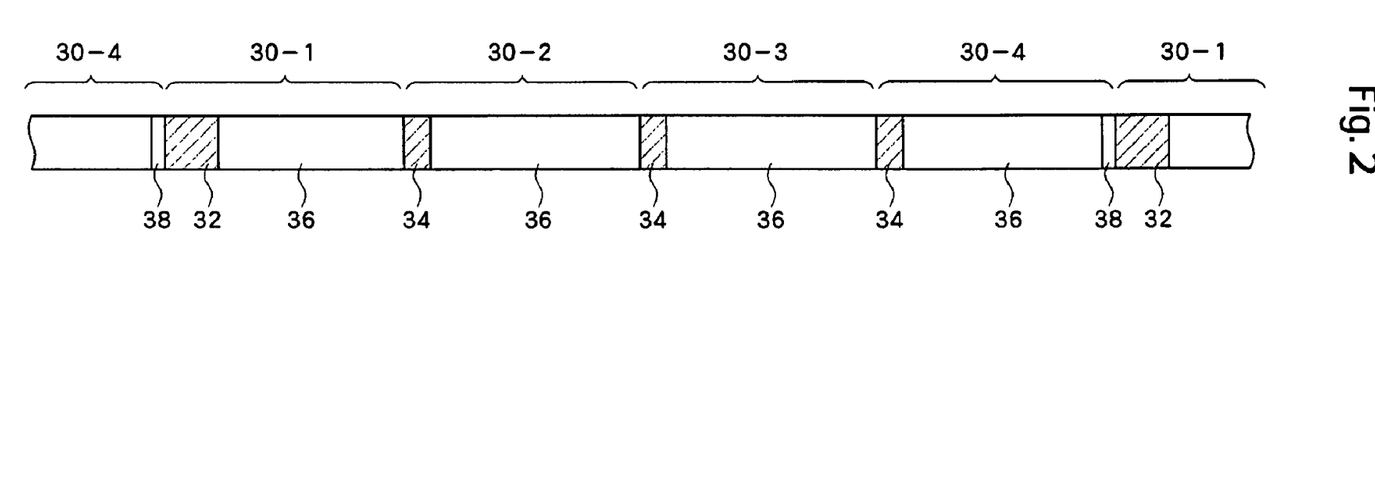
FIG. 2 is a schematic diagram illustrating a track format.

FIG. 2 is a schematic diagram illustrating a format of each track on the disk 2. In the figure, a direction in which the rotation of the disk 2 causes a track to pass through is leftward. The track is partitioned into servo sectors. Servo data part 32 or 34 is located at the top of each of the servo sectors 30; and user data part 36 is located immediately after the servo data part 32 or 34. One of the two kinds of servo data parts, either the servo data part 32 or 34, is located in each of the servo sectors 30 of this disk drive.

The servo data part 32 has the same data structure as that used in the conventional disk drives. To be more specific, the servo data part 32 includes, for example, servo AGC, a truck number, a servo sector number, and signals such as a burst signal. For the reason described later, a gap part 38 is provided adjacent to the servo data part 32 at the forward side thereof and has the specified length to which no data is written. The other kind of servo data part, that is to say, the servo data part 34, is formed of a burst signal field. The size of the servo data part 34 is smaller than that of the servo data part 32. In addition, differently from the servo data part 32, the servo data part 34 does not have a gap part between the servo data part 34 and the user data part 36. Accordingly, the servo data part 34 is adjacent to the user data parts 36 on both sides.

The servo data parts 32 are formed at intervals of, for example, four servo sectors. The servo data parts 32 are read out and made use of in the write and the read operation of user data. On the other hand, the servo data parts 34 are formed in the other servo sectors 30-2 through 30-4 that are put between the two servo sectors 30-1, each of which is provided with the servo data parts 32. The servo data parts 34 are read out and made use of only in the read operation.

Incidentally, because a servo sector number is stored only in the servo data part 32, the servo sectors may also be viewed under the concept that a series of the servo sectors 30-1 through 30-4 is treated as one servo sector, and that each of the servo sectors 30-1 through 30-4 is treated as a subservo sector. In such a case, the servo sector number which is stored in the servo data part 32 can be defined as a serial number.

Figure 3:
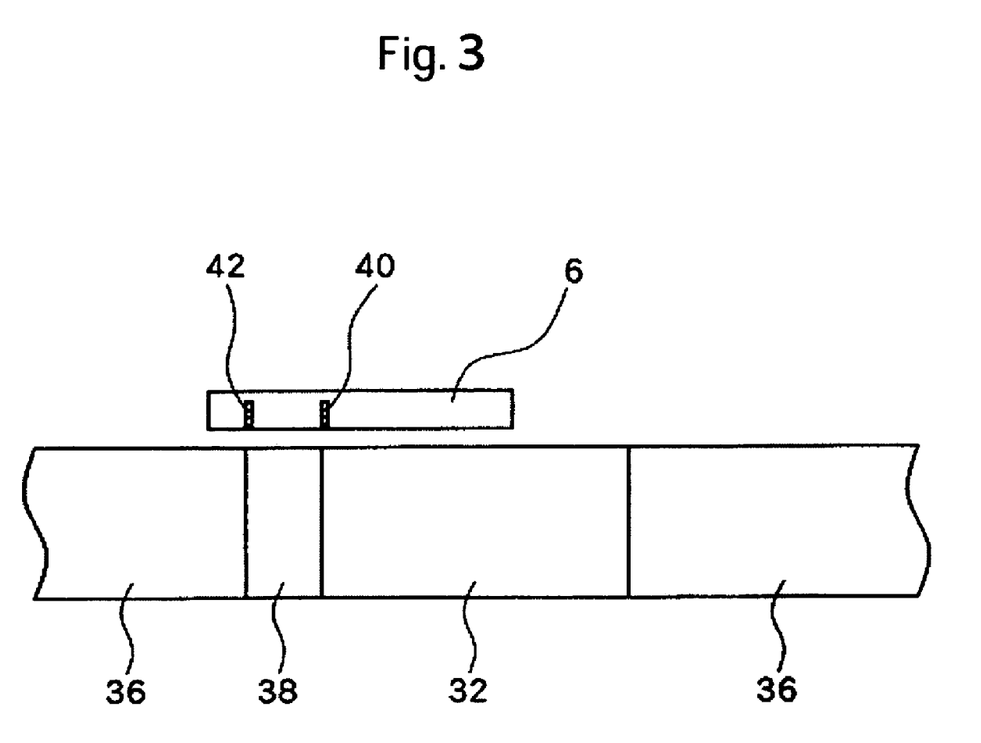
FIG. 3 is a schematic diagram illustrating a head that moves over a track.

FIG. 3 is a schematic diagram illustrating the head 6 that moves over a track. A read element 40 for reading data from the disk 2 and a write element 42 for writing data to the disk 2 are placed on the head 6 with the distance between the read element 40 and the write element 42 being given in the track direction. Here, the read element 40 and the write element 42 are located over the track so that the read element 40 goes ahead of the write element 42 over the track when scanning the track.

Both at the time of write operation and at the time of read operation, the read/write circuit 16 monitors a servo data signal detected by the read element 40. At the time of write operation, the read/write circuit 16 handles only servo data obtained from the servo data part 32, and ignores data obtained from the servo data part 34. To be more specific, at the time of write operation, while reading servo data obtained from the servo data part 32 through the read element 40, the read/write circuit 16 supplies a signal to the write element 42 to write data to the user data part 36. As soon as it is detected that the read element 40 arrives at the servo data part 32, the supply of the signal to the write element 42 is stopped so as to prevent a magnetic field generated by the write element 42 from interfering with the reading of the read element 40. Accordingly, the gap part 38, the length of which corresponds to the distance between the read element 40 and the write element 42, is formed immediately before the servo data part 32. On the other hand, even if the read element 40 arrives at the servo data part 34, data in the servo data part 34 is ignored. The interference, therefore, does not become a problem, and it is not necessary to stop the supply of the signal to the write element 42. Accordingly, it is possible to write user data up to a position adjacent to the servo data part 34.

In addition, because the supply of the signal to the write element 42 is always stopped during the read operation, the signal interference does not occur between the read element 40 and the write element 42. At the time of read operation, the read/write circuit 16 handles data obtained from both the servo data part 32 and the servo data part 34. Here, AGC gain is adjusted, and information about a truck number and a servo sector number is acquired, on the basis of the servo data part 32. However, when reading the servo data part 34, the AGC gain adjustment and the information acquisition are not performed so that the current state is maintained.

The drive circuit 14 controls the SPM 4. At the time of write operation, the drive circuit 14 sets the rotational speed of the disk 2 at Nw, which is the high-speed rotational speed. On the other hand, at the time of read operation, the drive circuit 14 sets the rotational speed of the disk 2 at Nr, which is the low-speed rotational speed. For example, Nw is 7200 rpm; and Nr is 1800 rpm, which is a quarter of Nw. Bw is the allocation density per track of a burst signal in the servo data part 32, the burst signal being made use of at the time of write operation. Br is the allocation density per track of burst signals in both the servo data part 32 and the servo data parts 34, the burst signal being made use of at the time of read operation. For example, Bw is 100 per round; and Br is 400 per round, which is four times of Bw. A ratio (Bw/Br) of the allocation density Bw of the burst signal in the servo data part 32, which is made use of at the time of write operation, to the allocation density Br of the burst signals in both the servo data part 32 and the servo data parts 34, which is made use of at the time of read operation, corresponds to an inverse number of a ratio (Nw/Nr) of this rotational speed. Therefore, in the case where the required precision of servo control at the time of write operation by servo control period τw can be achieved, it can be expected to achieve the required precision of the servo control at the time of read operation at the low rotational speed Nr if the allocation density Br of the burst signals is set so that servo control period τr becomes substantially equivalent to the servo control period τw at the time of write operation. Here, the servo control period τw is determined by the allocation density Bw of the on-track burst signal in the servo data part 32 in a usual format and by the rotational speed Nw. Furthermore, the servo control period τr is determined by the allocation density Br of the on-track burst signals in both the servo data part 32 and the servo data parts 34 and by the rotational speed Nr. For this reason, in the above configuration of the disk 2, the intervals between the servo data parts 32 are interpolated by the servo data parts 34 including the burst signal; and the allocation density Br of the burst signals is set at a value corresponding to (Nw/Nr) Bw, that is to say, four times of Bw. The allocation density Br0 of the servo data part 34 used for the interpolation becomes (Nw/Nr−1) Bw. In this example, the allocation density of the servo data part 32 is 100 per round. Then, an interpolation is made with the servo data parts 34 by 300 per round, and consequently the allocation density Br becomes 400 per round. At this time, both of the servo control periods τw, τr are 83 μs.

Accordingly, if the rotational speed Nr at the time of read operation is reduced, forming more servo data parts 34 between the servo data parts 32 makes it possible to ensure the required precision of the servo control at the time of read operation.

Here, the fact is that with the increase in the servo data parts 34 formed between the servo data part 32, the capacity capable of storing user data decreases. However, as described above, the servo data part 34 includes only a burst signal, and accordingly the data size thereof is small. Moreover, in contrast to the servo data part 32, the servo data part 34 is not accompanied by the gap part 38. Accordingly, even if the servo data parts 34 are formed in response to the low rotational speed Nr that can be actually adopted, the decrease in capacity of storing user data as a result of the formation of the servo data parts 34 is slight.

Figure 4:
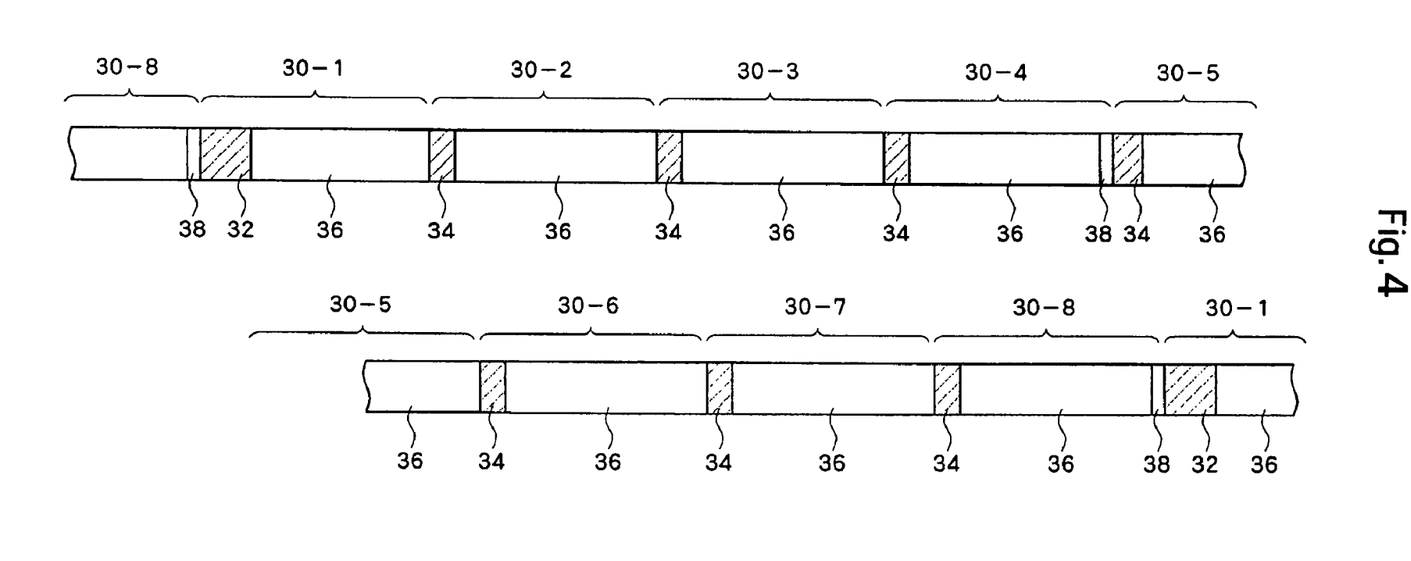
FIG. 4 is a schematic diagram illustrating another track format.

FIG. 4 is another schematic diagram illustrating a format of each track on the disk 2. Points of difference with FIG. 2 will be described. In the figure, a direction in which the rotation of the disk 2 causes a track to pass through is leftward. The track is divided into servo sectors. Servo data part 32 or 34 is located at the top of each of the servo sectors 30; and user data part 36 is located immediately after the servo data part 32 or 34. One of the two kinds of servo data parts, either the servo data part 32 or 34, is located in each of the servo sectors 30 of this disk drive.

For the reason described later, a gap part 38 is provided adjacent to the servo data part 32 at the forward side thereof and has the specified length to which no data is written. In addition, for the reason described below, the servo data parts 34 are grouped into ones having a gap part between the servo data part 34 and the user data part 36, and ones that do not have a gap part between the servo data part 34 and the user data part 36.

The servo data parts 32 are formed at intervals of, for example, eight servo sectors. The servo data parts 32 are read out and made use of in the write operation, and the read operation, of user data. On the other hand, the servo data parts 34 are formed in the other servo sectors 30-2 through 30-8 that are put between the two servo sectors 30-1, each of which is provided with the servo data parts 32. In addition, the servo data parts 34 are grouped into one (a front part of 30-5) that is read out and made use of in the write operation, and the read operation, of user data, and ones (front parts of 30-2-4, and of 30-6 through 30-8) that are read out and made use of only in the read operation.

Incidentally, because a servo sector number is stored only in the servo data part 32, the servo sectors may also be viewed under the concept that a series of the servo sectors 30-1 through 30-8 is treated as one servo sector, and that each of the servo sectors 30-1 through 30-8 is treated as a subservo sector. In such a case, the servo sector number which is stored in the servo data part 32 can be defined as a serial number.

Figure 5:
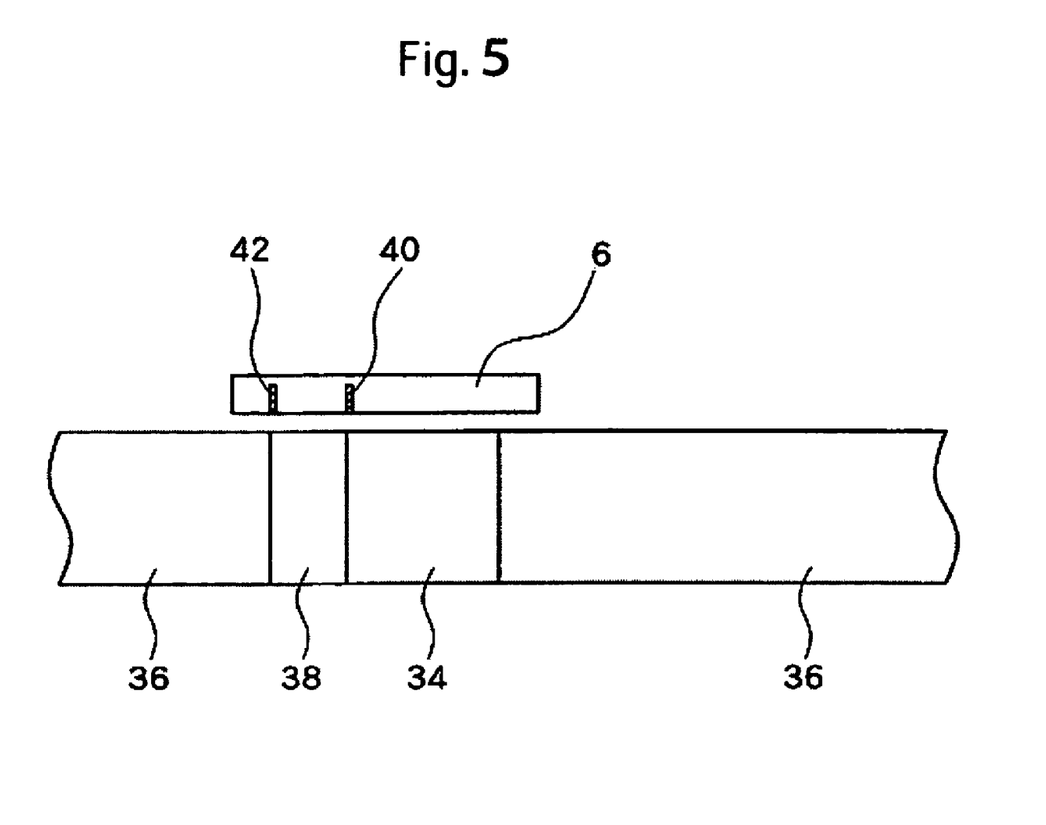
FIG. 5 is another schematic diagram illustrating a head that moves over a track.

FIG. 5 is a schematic diagram illustrating the head 6 that moves over a track. A read element 40 for reading data from the disk 2 and a write element 42 for writing data to the disk 2 are placed on the head 6 with the distance between the read element 40 and the write element 42 being given in the track direction. Here, the read element 40 and the write element 42 are located over the track so that the read element 40 goes ahead of the write element 42 over the track when scanning the track.

Both at the time of write operation and at the time of read operation, the read/write circuit 16 monitors a servo data signal detected by the read element 40. At the time of write operation, the read/write circuit 16 handles only servo data obtained from the servo data part 32 and the servo data part 34 of the servo sector 30-5, and ignores data acquired from the servo data parts 34 located in front parts of the other servo sectors 30-2 through 30-4, and 30-6 through 30-8. To be more specific, at the time of write operation, while reading the servo data obtained from the servo data part 32 and the servo data part 34 of the servo sector 30-5 through the read element 40, the read/write circuit 16 supplies a signal to the write element 42 to write data to the user data part 36. As soon as it is detected that the read element 40 arrives at the servo data part 32 or the servo data part 34 of the servo sector 30-5, the supply of the signal to the write element 42 is stopped so as to prevent a magnetic field generated by the write element 42 from interfering with the reading of the read element 40. Accordingly, the gap parts 38, the length of which corresponds to the distance between the read element 40 and the write element 42, are formed immediately before the servo data part 32 and the servo data part 34 of the servo sector 30-5. On the other hand, even if the read element 40 arrives at the other servo data parts 34, data in the servo data part 34 is ignored. The interference, therefore, does not become a problem, and it is not necessary to stop the supply of the signal to the write element 42. Accordingly, in these servo data parts 34 (the front parts of 30-2 through 30-4, and 30-6 through 30-8), it is possible to write user data up to each adjacent position.

In addition, because the supply of the signal to the write element 42 is always stopped during the read operation, the signal interference does not occur between the read element 40 and the write element 42. At the time of read operation, the read/write circuit 16 handles data obtained from both the servo data part 32 and the servo data part 34. Here, AGC gain is adjusted, and information about a truck number and a servo sector number is acquired, on the basis of the servo data part 32. However, when reading the servo data part 34, the AGC gain adjustment and the information acquisition are not performed so that the current state is maintained.

The drive circuit 14 controls the SPM 4. At the time of write operation, the drive circuit 14 sets the rotational speed of the disk 2 at Nw, which is the high-speed rotational speed. On the other hand, at the time of read operation, the drive circuit 14 sets the rotational speed of the disk 2 at Nr, which is the low-speed rotational speed. For example, Nw is 7200 rpm; and Nr is 1800 rpm, which is a quarter of Nw. Bw is the allocation density per track of burst signals in the servo data part 32 and the servo data part 34 of the servo sector 30-5, the burst signals being made use of at the time of write operation. Br is the allocation density per track of burst signals in both the servo data part 32 and the servo data parts 34, the burst signals being made use of at the time of read operation. For example, Bw is 100 per round (accordingly, the allocation density of the servo data part 32 is 50 per round); and Br is 400 per round, which is four times of Bw. A ratio (Bw/Br) of the allocation density Bw of the burst signals in the servo data part 32 and the servo data part 34 of the servo sector 30-5, which are made use of at the time of write operation, to the allocation density Br of the burst signals in both the servo data part 32 and the servo data parts 34, which are made use of at the time of read operation, corresponds to an inverse number of a ratio (Nw/Nr) of this rotational speed. Therefore, in the case where the required precision of servo control at the time of write operation by servo control period τw can be achieved, it can be expected to achieve the required precision of the servo control at the time of read operation at the low rotational speed Nr if the allocation density Br of the burst signals is set so that servo control period rr becomes substantially equivalent to the servo control period τw at the time of write operation. Here, the servo control period τw is determined by the allocation density Bw of the on-track burst signals in the servo data part 32 and the servo data part 34 of the servo sector 30-5 in a usual format and by the rotational speed Nw. Furthermore, the servo control period τr is determined by the allocation density Br of the on-track burst signals in both the servo data part 32 and the servo data parts 34 and by the rotational speed Nr. For this reason, in the above configuration of the disk 2, the intervals between the servo data parts 32 are interpolated by the servo data parts 34 including the burst signal; and the allocation density Br of the burst signals is set at a value corresponding to (Nw/Nr) Bw, that is to say, four times of Bw. The allocation density Br0 of the servo data part 34 used for the interpolation becomes (Nw/Nr−1) Bw. In this example, the allocation density of the servo data part 32 is 50 per round, and the allocation density of the servo data part 34 of the servo sector 30-5, which is included in Bw, is 50 per round. Bw is 100 per round. Moreover, the servo data parts 34 belonging to Br are interpolated by 300 per round, and the allocation density Br becomes 400 per round. At this time, both of the servo control periods τw, τr are 83 μs.

Accordingly, if the rotational speed Nr at the time of read operation is reduced, defining more servo sectors between the servo data part 32 and the servo data part 34 of the servo sector 30-5, and then forming the servo data parts 34 in the defined servo sectors, make it possible to ensure the required precision of the servo control at the time of read operation.

Here, part of servo data used at the time of write operation is formed by the servo data part 34 (servo sector 30-5) so that the servo area is reduced. However, the fact is that with the increase in the servo data parts 34 located between the servo data part 32 and the servo data part 34 of the servo sector 30-5, the capacity capable of storing user data decreases. However, as described above, the servo data part 34 includes only a burst signal, and accordingly the data size thereof is small. In addition, the servo data parts 34 (front parts of 30-2 through 30-4, and those of 30-6 through 30-8), which are interpolated for read operation, are not accompanied by the gap part 38. Accordingly, even if the servo data parts 34 are formed in response to the low rotational speed Nr that can be actually adopted, the decrease in capacity of storing user data as a result of the formation of the servo data parts 34 is slight.

In the above-mentioned description, the user data part 36 is not described in detail. However, if the servo data part 32 and the servo data part 34 are located so that the periodicity of the servo control is ensured, the size of the area does not always become the same. For example, if areas of the gap part 38 and of the servo data part 32 are large, the user data parts 36 such as the servo sector 30-4 and the servo sector 30-8 may also become shorter than the others. In addition, the size of the other user data parts 36 may also differ from one another.

Moreover, as described above, by making the servo control period τr at the time of read operation equivalent to the servo control period τw at the time of write operation, the required precision of the servo control is ensured both at the time of read operation and at the time of write operation. However, it is not always desired that the servo control period at the time of read operation be made equivalent to the servo control period at the time of write operation. If data is written by mistake at a position that largely deviates from the track center, the following problems arise: data in an adjacent track is overwritten and is thereby erased; even if data is read out exactly at the track center position, the reading fails; and the like. Therefore, the high-level capability of servo control is required at the time of write operation. On the other hand, at the time of read operation, even if data is written by mistake at a position that deviates from the track center, there is a possibility that it will be able to correctly read out the data by functions such as a signal regeneration function and an error correction function. Judging from the above, it is possible to make the servo control period τr at the time of read operation larger than the servo control period τr at the time of write operation to some extent. In other words, the allocation density Br per track of a burst signal which is made use of at the time of read operation can be made lower than that in the case where the servo control period τr is made equivalent to the servo control period τw. Accordingly, it is also possible to reduce the number of servo data parts used for the interpolation at the time of read operation. Therefore, the decrease in capacity of storing user data, caused by the formation of the servo data parts, can be further minimized.

As far as this magnetic disk drive is concerned, for example, in a case where music data and video data are stored in a personal digital assistant, which is brought out for use on the road, the write operation of writing the music and video data to the magnetic disk drive is performed at high rotational speed, making it possible to reduce the recording time. On the other hand, at the time of read operation in which music data and video data are reproduced, a disk is driven at low rotational speed that is, for example, a quarter of the speed at the time of write operation. If the read operation is performed at low rotational speed, the acceleration at the time of starting up becomes gentle, and a pulse-drive frequency for example at steady rotation is reduced, thereby enabling the reduction in power consumption.

Further, as a result of reproducing music and video in parallel with the read operation, data, the amount of which is greater than or equal to the capacity of the buffer memory of the interface circuit 18 or that of the buffer memory on the main body side of information terminal equipment, can be extracted from the disk 2 in succession, more specifically, without stopping the rotation of the disk 2. This makes it possible to reduce the number of times the magnetic disk drive is started up, and thereby to reduce the power consumption required to starting up the magnetic disk drive. The closer a data rate at which data is reproduced at the time of read operation is to reproduction rates of music data and of video data on the main body side of the information terminal equipment, this effect becomes larger. Accordingly, for the purpose of the reduction in power consumption, it is desirable that in consideration of fluctuations in the reproduction rates of music data and of video data as margins, the low rotational speed at the time of read operation be made as close to the reproduction rates in question as possible.

If the read operation is performed at low rotational speed, a data rate of data read out from the disk 2 decreases. Corresponding to this, processing in the read/write circuit 16 and in the interface circuit 18, such as decode processing and error-correction processing, can also be performed at low speed. For this reason, the CPU 20 controls a clock generation circuit that drives a processing circuit for handling read data, and decreases the clock frequency of the clock generation circuit in response to the rotational speed. As a result, the power consumption of the processing circuit in the reproduction system is reduced.

It is also expected that when write operation of writing data to the magnetic disk drive is performed at high rotational speed, read operation also occurs as a result of an interruption.

In this case, it is also possible to perform the read operation at high speed by, as is the case with the write operation, performing the servo control by use of the first servo data with the rotation being kept at high rotational speed, without changing the rotational speed of the magnetic disk medium to the low rotational speed. Even if the present invention is applied, such read operation at high rotational speed is not hindered. However, in this case, an effect of reducing the power consumption, and the like, are not produced.

Incidentally, in the configuration described above, the servo data part 32 includes a burst signal, and the servo data parts 34 are located at positions at which basically the distance between the servo data parts 32 is internally divided at regular intervals. This makes it possible to detect a burst signal at constant periods, and thereby to achieve the stable servo control. Further, it is also possible to achieve the stable servo control by configuring the servo data part 32 to have a data structure including no burst signal, and by locating the servo data parts 34, each of which includes a burst signal, evenly over the whole circumference of a track.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
   a magnetic disk medium on which first servo data or second servo data, which partitions a track, is selectively written; and
   a control circuit that performs, at high rotational speed, write operation of writing user data to an user data part in the track, and that performs, at low rotational speed, read operation of reading the user data from the user data part in the track;
   wherein:
   said first servo data forms first servo sectors that are discretely located on the track, and is read out at least at the time of the write operation between the write operation and the read operation; and
   said second servo data forms second servo sectors that are located between the first servo sectors, and is read out only at the time of the read operation between the write operation and the read operation.

2. A magnetic disk drive according to claim 1, wherein:
   a ratio of the allocation density per track of a position-information detection signal of servo data to be read out at the time of the read operation to the allocation density per track of a position-information detection signal of servo data to be read out at the time of the write operation is set in response to a ratio of the high rotational speed to the low rotational speed.

3. A magnetic disk drive according to claim 1, wherein:
   a servo control period at the time of the read operation is larger than a servo control period at the time of the write operation.

4. A magnetic disk drive according to claim 1, further comprising:
   a magnetic head in which a read element for reading data from the magnetic disk medium and a write element for writing data to the magnetic disk medium are located with the distance in the track direction being given; and
   a control circuit that performs the write operation and the read operation, and that stops writing executed by the write element at the time of reading executed by the read element.

5. A magnetic disk drive according to claim 4, wherein:
   said write element is located in the downstream of the read element with respect to the rotation direction of the magnetic disk medium.

6. A magnetic disk drive according to claim 5, wherein:
   a gap area having the specified length, to which data is not written, is formed at a position adjacent to a servo data part of the first servo sector that is read out at the time of the write operation; and
   a servo data part of the second servo sector, which is read out only at the time of the read operation, is not accompanied by the gap area.

7. A magnetic disk drive according to claim 6, wherein:
   said gap area is adjacent to the front side of the first servo data with respect to the rotation direction of the magnetic disk medium.

8. A magnetic disk drive according to claim 6, wherein:
   said gap area is formed as a gap part, the length of which is greater than or equal to the physical distance in the track direction between the write element for writing data, and the read element for reading data, of a read/write head.

9. A magnetic disk drive according to claim 1, wherein:
   said second servo sector corresponds to each servo sector that is located between the first servo sectors, and said first servo data is read out at the time of the write operation and at the time of the read operation.

10. A magnetic disk drive according to claim 1, wherein:
    at least one of said first servo data has the data size that is larger than the data size of the second servo data.

11. A magnetic disk drive according to claim 10, wherein:
    said second servo data includes only a burst signal from among components of servo data.

* * * * *